United States Patent [19]
Hashimoto et al.

[11] Patent Number: 5,132,173
[45] Date of Patent: Jul. 21, 1992

[54] MAGNETIC RECORDING MEDIUM HAVING A SILICON OXIDE PROTECTIVE LAYER WITH AN ELECTRICAL SPECIFIC RESISTANCE OF FROM $3.3 \times 10^{13}$ TO $5.0 \times 10^{15}$ OHM.CM

[75] Inventors: Morimi Hashimoto, Wako; Takashi Suzuki, Yokohama, both of Japan

[73] Assignee: Canon Kabushiki Kaisha, Tokyo, Japan

[21] Appl. No.: 478,837

[22] Filed: Feb. 9, 1990

[30] Foreign Application Priority Data

Feb. 10, 1989 [JP] Japan .................................. 1-032467

[51] Int. Cl.⁵ ................................................ G11B 5/00
[52] U.S. Cl. ...................................... 428/336; 428/694; 428/695; 428/900; 428/409; 428/432; 428/433; 428/64; 204/192.2; 204/192.23
[58] Field of Search .............. 428/900, 694, 695, 409, 428/432, 433, 336; 204/192.2, 192.23

[56] References Cited

U.S. PATENT DOCUMENTS

| | | | |
|---|---|---|---|
| 4,645,703 | 2/1987 | Suzuki et al. | 428/141 |
| 4,666,759 | 5/1987 | Ohkawa et al. | 428/213 |
| 4,688,130 | 8/1987 | Nakanouchi et al. | 360/135 |
| 4,713,279 | 12/1987 | Fujiwara et al. | 428/142 |
| 4,717,622 | 1/1988 | Kurokawa et al. | 428/408 |
| 4,725,482 | 2/1988 | Komoda et al. | 428/215 |
| 4,756,967 | 7/1988 | Hashimoto et al. | 428/336 |
| 4,762,742 | 8/1988 | Sonoda et al. | 428/141 |
| 4,816,351 | 3/1989 | Takagi et al. | 428/694 |
| 4,824,708 | 4/1989 | Suzuki et al. | 428/64 |
| 4,833,031 | 5/1989 | Kurokawa et al. | 428/336 |
| 4,910,068 | 3/1990 | Takagi et al. | 428/141 |

FOREIGN PATENT DOCUMENTS 115229 10/1986 Japan .
229526 8/1987 Japan .

Primary Examiner—Merrell C. Cashion, Jr.
Assistant Examiner—Stevan A. Resan

[57] ABSTRACT

A magnetic recording medium comprises a substrate and provided on at least one side thereof a magnetic recording layer and a protective layer of thin film mainly composed of an oxide of silicon, in this order. Said protective layer has an electrical specific resistance of not less than $10^{12}$ Ω. cm.

13 Claims, 5 Drawing Sheets

MAGNETIC RECORDING MEDIUM HAVING A SILICON OXIDE PROTECTIVE LAYER WITH AN ELECTRICAL SPECIFIC RESISTANCE OF FROM $3.3 \times 10^{13}$ TO $5.0 \times 10^{15}$ OHM.CM

BACKGROUND OF THE INVENTION

1. Field of the Invention

The present invention relates to a magnetic recording medium exemplified by a floppy disk, a video tape, and other rigid disk-like mediums. More particularly, it relates to a magnetic recording medium of a ferromagnetic metal thin-film type, having wear resistance, travel stability, and environmental resistance.

2. Related Background Art

In recent years, there is an increasing demand for magnetic recording mediums capable of high-density recording, as information storage requires greater capacity in the field of information processing techniques and as picture or image quality is improved. Under such circumstances, research and development are energetically made so that such demand can be met.

In such research and development, metal thin film magnetic recording mediums comprising a ferromagnetic metal thin film of Co-Ni, Co-Cr or the like as a magnetic recording layer, formed by sputtering or vapor deposition are considered hopeful as mediums which are suitable for high-density recording, compared with coat-type magnetic recording mediums which are commonly used at present.

In the metal thin-film magnetic recording mediums, as distinct from the coat-type magnetic recording medium, the whole thin film contributes to the magnetic recording and also has a high flatness, so that it becomes possible to make spacing loss very small.

If it is possible to utilize the advantages of such metal thin-film magnetic recording mediums, a magnetic recording medium would be obtainable that has both output and S/N ratio greatly surpassing those of the coat-type magnetic recording mediums.

In recording systems, employment of a system made to have narrower tracks and shorter wavelengths enables high-density recording with a density at least several times the density that can be attained by the coat-type magnetic recording mediums.

In the present state of things, however, various problems still remain to be solved for putting the metal thin-film magnetic recording mediums into practical use.

For example, in flexible mediums such as video tapes, video floppy disks, data-recording tapes and floppy disks, the magnetic recording medium travels while coming into partial contact with a magnetic head, and recording or reproduction is thus carried out. Then, the probability of the contact between the magnetic head and medium tends to increase as the spacing loss is made smaller in order to achieve the high-density recording. In rigid magnetic recording mediums comprising a substrate made of nonmagnetic metal or the like, it is common for the medium and magnetic head to come into contact with each other when the medium is standing.

However, a magnetic recording layer comprising the metal thin film is subject to damage as a result of contact with the magnetic head. Once the layer has been damaged, the travel performance becomes poor, resulting in a lowering of output, or sometimes resulting in travel failure. This has been the greatest problem that has hindered the metal thin-film magnetic recording mediums from being put into practical use.

Another problem involved in putting the metal thin-film magnetic recording mediums into practical use is that some type of metals used result in corrosion of the magnetic recording layer of the metal thin film when it is brought into contact with the air for a long period of time. For example, a Co-Ni metal thin film may corrode in a short time in an environment of high temperature and high humidity or the environment wherein salt is in the air.

The coat-type magnetic recording mediums conventionally used in video tapes, video floppy disks, data-recording floppy disks, etc. are formed by mixing magnetic powder in a binder and coating the resulting mixture on a base film. These mediums originally have a finely roughened surfaces such that they have a small frictional resistance. Materials with excellent wear resistance or lubricity are also added in the binder, whereby the problem concerning the sliding to the magnetic head has been settled, thus enhancing overall reliability.

On the other hand, in the metal thin-film magnetic recording mediums, it has been attempted to form a protective layer on the surface of the metal magnetic layer by the methods as described below, in order that the protective layer can impart (1) wear resistance, (2) lubricity and (3) environmental resistance to the magnetic recording medium.

(1) To impart wear resistance

An inorganic protective layer comprising a hard material is formed on the metal thin-film magnetic recording layer.

For example, a thin film comprising SiO, $SiO_2$, SiN, $Al_2O_3$, $TiO_2$, or diamond-like carbon is formed by vacuum deposition, sputtering, plasma CVD or the like.

(2) To impart lubricity (i) a protective layer comprising lubricating material(s) is formed on the metal thin-film magnetic recording layer or on the above inorganic protective layer.

For example, a thin film comprising an inorganic material such as $MoS_2$, $WS_2$, diamond-like carbon, or amorphous carbon is formed by vacuum deposition, sputtering, plasma CVD or the like. Alternatively, a layer comprising an organic material such as a fluorine resin, a silicone oil surface active agent, a saturated fatty acid or an ester oligomer is formed by the coating-solution coating, vacuum deposition, sputtering or the like.

(ii) fine irregularities are formed on the surface of the magnetic recording medium so that the true contact points may be decreased to lower friction coefficient.

(3) To impart environmental resistance

A corrosion-resistant protective layer is formed.

For example, a layer comprising an elemental single substance such as Al, Cr, Ti, V or Si, a layer comprising an oxide, nitride, carbide, boride or the like of the above elements, a composite layer comprised of these layers, or a layer comprising a polymeric material such as polyethylene, polyimide or nylon is formed by vacuum deposition, sputtering, plasma CVD, coating-solution coating or the like.

The standards of durability for floppy disks by which reliability is measured include checking to ensure that data-recording floppy disks exhibit a continuous-travel durability of not less than 3,000,000 passes at ordinary temperature and not less than 1,000,000 passes at high (about 50° C.) and low temperature (about 10° C.); and that video floppy disks exhibit a continuous-travel durability of, not less than 48 hours (about 10,000,000 passes)

at ordinary temperature, high temperature and high humidity (40° C., 85% RH), or low temperature (−5° C.).

The metal thin-film magnetic recording mediums, however, may cause scratches or deposits on the surface of the medium or the surface of the magnetic head after their travel of several ten thousand to several hundred thousand passes at most, resulting in a great lowering of reproduction output. Thus, they can not be said at all to have reached a practical level. The conventional rigid metal thin-film magnetic recording mediums also cause scratches or deposits (aggregation of fine powder) on the surface of the medium or the surface of the magnetic head as a result of CSS (contact start stop) repeated several times to several thousand times. Thus, the reproduction output is lowered to a great extent.

This is because conventional protective layers lack sufficient hardness, so that the protective layer itself is damaged as a result of its sliding to the magnetic head, and the damage of the protective layer extends to the magnetic recording layer. Fine powder produced at this time adheres to the magnetic head to bring about clogging of the head, causing an extreme lowering of reproduction output (for example, a dropout) in some instances, or causing damage such as scratches on the surface of the medium or head in a worst instance. The durability of the medium and head is thus impaired.

A proposal has been made on a magnetic recording medium comprising a protective layer in which an oxide of silicon is used (as disclosed, for example, in Japanese Patent Application Laid-Open No. 61-115229, No. 61-178730 and No. 62-229526). This, however, is still not satisfactory.

In the data-recording floppy disks, there is an example in which a $Co_3O_4$ film, serving also as a solid lubricating film, is used as the protective layer of a Co-Cr magnetic layer, and which shows a still durability of not less than 10,000,000 passes [Samoto et al, SHINGAKU GIHO 87-15 (1987)]. Experiments made by the present inventors, however, have confirmed that the thin film layer comprising $Co_3O_4$ can give no satisfactory long-term storage durability and environmental resistance. The conventional metal thin-film magnetic recording mediums cause corrosion on the metal thin-film magnetic recording layer in about 0.1 to 10 hours at best when an environmental durability test is carried out (target specifications: not less than 500 hours under conditions of 85° C., 85% RH). Thus, they have reached no practical level of durability under actual conditions.

SUMMARY OF THE INVENTION

An object of the present invention is to solve the problems discussed above, to provide a magnetic recording medium having superior overall durability as in wear resistance, environmental resistance, long-term storage durability and so forth.

The magnetic recording medium of the present invention comprises a substrate and provided on at least one side thereof a magnetic recording layer and a protective layer of thin film mainly composed of an oxide of silicon, in this order, and said protective layer has an electrical specific resistance of not less than $10^{12}$ Ω.cm.

DESCRIPTION OF THE PREFERRED EMBODIMENTS

The magnetic recording medium of the present invention comprises a magnetic recording layer of a ferromagnetic metal thin film, and provided thereon a protective layer comprising an oxide of silicon (or herein often "silicon oxide").

It is commonly known that the film quality of the protective layer greatly depends on conditions for the film formation thereof and also varies with the film thicknesses.

The present inventors made intensive studies on the film quality and durability of thin films having a thickness of several hundred angstroms and comprising an oxide of silicon that fundamentally has long-term storage durability and environmental resistance. As a result, they discovered that the wear resistance and durability of the thin films can be improved, showing travel durability (or pass durability) reaching a level of not less than 10,000,000 passes, and in the CSS tests, not less than 20,000 times, and the long-term storage durability and environmental resistance can be made excellent when the physical properties (for example, electrical specific resistance and refractive index) of the thin film comprising an oxide of silicon are made close to the physical properties of bulk silicon dioxide. The present invention has been thus accomplished.

Figure 1:
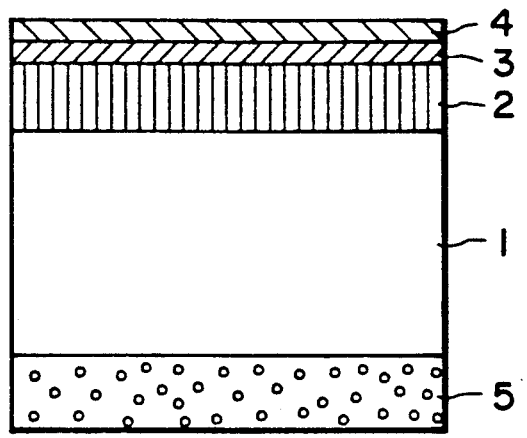
FIGS. 1 to 7 are partial illustrations of the fundamental constitution of the metal thin-film magnetic recording mediums according to the present invention.

FIG. 1 illustrates the fundamental constitution of a flexible magnetic recording medium according to the present invention. A substrate 1 may comprise a material hitherto commonly used as a base film for a flexible magnetic recording medium. In particular, it may preferably comprise a heat-resistant polymeric film with a glass transition point of not less than 200° C., as exemplified by a polyimide, polysulfone, a polyamidoimide, polyether ether ketone, or aramid. The front or back of the substrate 1 may optionally have a great number of fine protuberances (surface irregularities) so that the sliding properties of films or the travel stability of magnetic recording mediums can be improved.

When the magnetic layer or protective layer is formed on the surface of the substrate 1 having such surface irregularities, irregularities substantially corresponding to the fine irregularities on the surface of the base film are formed on its uppermost surface. In other words, the surface roughness of the substrate 1 comes to substantially correspond to the surface roughness of the magnetic recording medium formed.

On account of the spacing loss or dropout, the surface roughness, observed by taking the statistical distribution of the heights of protuberances within the area of not less than 10,000 μm², should be such that the height of the protuberance corresponding to 0.01% order from a highest protuberance is preferably not more than 600 Å, and more preferably not more than 300 Å, and the protuberance density ranges from $1 \times 10^4$ to $1 \times 10^9$ protuberances/mm$^2$, preferably from $1 \times 10^5$ to $1 \times 10^8$ protuberances/mm$^2$, and more preferably from $1 \times 10^6$ to $1 \times 10^7$ protuberances/mm$^2$.

Here, the surface roughness and protuberance height of the substrate or magnetic recording medium may be measured by the shadowing method, which is a non-contact measuring method, as disclosed in Japanese Patent Application Laid-Open No. 61-188818.

A ferromagnetic thin film 2 is formed as the magnetic recording layer on at least one side of the substrate 1, and a thin film 3 mainly composed of an oxide of silicon is formed thereon as the protective layer.

A ferromagnetic alloy film, a ferromagnetic oxide film, a ferromagnetic nitride film, or the like mainly composed of, for example, Fe, Co, or Ni can be utilized for the magnetic recording layer 2. These magnetic recording layers can be formed by a physical deposition process such as vacuum deposition, ion plating, or sputtering, or by plating. The present invention can be particularly effective especially when the magnetic recording layer is comprised of a Co-Cr perpendicular magnetization film comprising 15 to 23% by weight of Cr and 85 to 77% by weight of Co based on the weight of the perpendicular magnetization film, formed by vacuum deposition or sputtering.

The protective layer 3 comprises a thin film mainly composed of an oxide of silicon, and may preferably have an electrical specific resistance of not less than $10^{12}$, and more preferably in the range of from $1 \times 10^{13}$ to $1 \times 10^{15}$ Ω.cm. A most preferred protective layer has an electrical specific resistance ranging from $3.3 \times 10^{13}$ to $3.4 \times 10^{14}$ Ω.cm. This value is close to the value of a thermally oxidized SiO$_2$ film ($1.0 \times 10^{14}$ to $7.5 \times 10^{15}$ Ω.cm) or the bulk value of SiO$_2$ ($10^{12}$ to $10^{14}$; quartz glass: $>10^{15}$). An electrical specific resistance of less than $10^{12}$ Ω.cm may bring about an insufficient hardness, resulting in a poor wear resistance. An electrical specific resistance of more than $10^{15}$ Ω.cm may bring about an increase in the inner stress, sometimes causing fine cracking of the film or peeling of the film from its base. In both instances, the protective layer results in a layer with a poor durability.

The oxide of silicon, contained in the protective layer as a main component, may preferably be in an amount of not less than 80% by weight, and more preferably not less than 85% by weight, based on the total weight of protective layer.

The refraction index of the thin film having the above electrical specific resistance falls within the range of 1.460 to 1.500 (measured with an ellipsometer).

The above protective layer 3 can be formed by a physical deposition process such as vacuum deposition, ion plating, or sputtering, or by coating-solution coating. When it is formed by the physical deposition process, it is preferred that Si, SiO or SiO$_2$ is used as a deposition source and fed oxygen gas is not more than 15% based on the total pressure (Ar + fed gasses). When the protective layer 3 is formed by the physical deposition process, the value of the electrical specific resistance of the protective layer 3 can be controlled by regulating the gas pressure, oxygen partial pressure, substrate temperature, input power, film thickness, etc. For example, when the protective layer 3 is formed using an RF magnetron sputtering apparatus, the protective layer of the present invention can be formed under conditions of a substrate temperature of 200° C. or more, an argon pressure of 0.6 Pa or less, an input power of 2 kW or more, a film formation rate of 0.05 μm/min or more and a film thickness of 300 Å or less, using an SiO$_2$ target. In general, the electrical specific resistance tends to decrease with a decrease in the fed oxygen gas pressure. In instances in which the oxygen gas is not fed, the electrical specific resistance tends to increase with a decrease in the Ar gas pressure.

On the other hand, when the protective layer 3 is formed by the coating-solution coating, the electrical specific resistance of the protective layer can be controlled by regulating the concentration, curing temperature, curing time, coating thickness, etc.

Incidentally, the film mainly composed of the oxide of silicon has the problem that the internal stress tends to greatly change depending on environmental conditions, for example, in an environment of a high temperature and high humidity (for example, 40° C., 85% RH) or a low temperature (for example, −5° C.). In general, the internal stress changes from compression stress to tensile stress with a rise of temperature. A great change of the inner stress of the film may bring about a change in the flatness of the magnetic recording medium, cause cracking in the film, or cause film peeling.

In the case when the value of coefficient of thermal expansion of the above protective layer is extremely smaller than that of the ferromagnetic metal thin film that constitutes the magnetic recording layer, the magnetic recording medium formed tends to curl.

When there is a possibility that the above two problems arise, the protective layer should be incorporated with at least one of the element selected from the group consisting of B, C, N, P, S, Al, Ti, V, Cr, Zn, Ge, Zr, Nb, Mo, Ta, Mg, Hf, Au and Pt, or at least one of compounds containing at least one of these elements. Of these, B, Al$_2$O$_3$, TiO$_2$, B$_2$O$_3$, B$_2$O$_5$ and MgO are particularly preferred. They may be added in an amount that may not result in a lowering of the protective function (wear resistance) of the above protective layer, i.e., preferably in an amount of from 10 to 20% by weight based on the total weight of the protective layer.

The polymeric film substrate 1 may have a thickness of, for example, not more than 75 μm and not less than 6 μm. In the case of floppy disks with a small diameter, e.g., a floppy disk of 2 inches in diameter, the substrate may preferably have a thickness of not more than 40 μm and not less than 7 μm, and more preferably not more than 30 μm and not less than 7 μm.

On the other hand, the magnetic recording layer 2 may desirably have a thickness of from about 0.1 to 1.0 μm, which is not particularly limiting. The protective layer 3 may have desirably a thickness of not more than 300 Å, and preferably not more than 250 Å. The lower limit of the thickness of the protective layer 3 may be set to a measure that may not result in the impairment of the function of the protective layer 3, for example, be not less than 50 Å, and preferably not less than 100 Å.

Use of the protective layer with the thickness as describe above makes it possible to obtain a magnetic recording medium in which the spacing loss has been satisfactorily decreased.

An organic lubricating layer 4 may be optionally formed on the protective layer 3, whereby it becomes possible to improve the wear resistance and durability under more severe environmental conditions of a high temperature and high humidity or a low temperature.

Materials utilizable for the organic lubricating layer 4 include fluorine resins, silicone oils, surface active agents, saturated fatty acids, and ester oligomers. The layer can be formed by coating-solution coating such as dipping or spin coating, or a physical deposition process such as vacuum deposition or sputtering.

The organic lubricating layer 4 may have desirably a thickness of not more than 100 Å, and preferably not more than 30 Å.

The presence of the organic lubricating layer 4 may cause the spacing loss as in the case of the protective layer 3. The spacing loss can be sufficiently decreased by controlling the layer thickness as described above.

A back coat layer 5 may be optionally formed on the back of the polymeric film substrate 1 for the purpose of lubrication.

The back coat layer 5 can be formed by applying a composition obtained by dispersing inorganic fine particles of carbon black, graphite, $CaCO_3$ or the like in a binder such as a polyester resin, a polyurethane resin or a urethane resin. Layers comprising such a composition commonly used can be utilized therefor.

Figure 2:
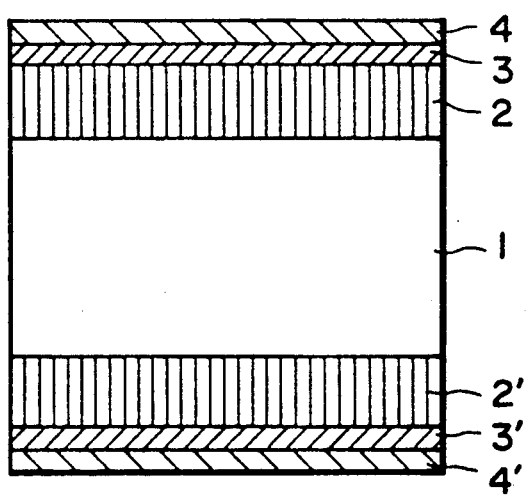
Figure 3:
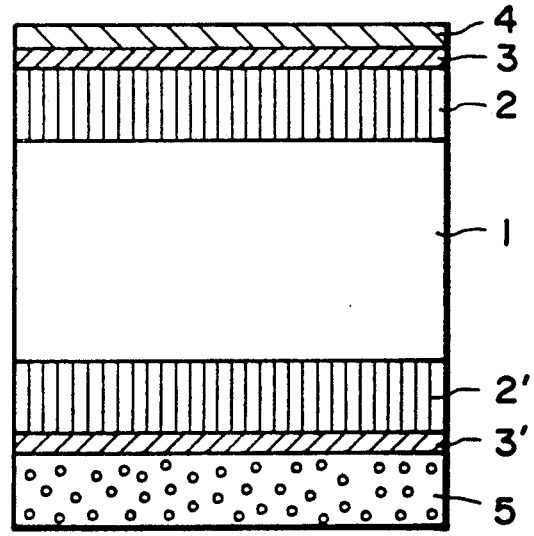

The magnetic recording medium of the present invention may also be comprised of, as shown in FIG. 2, a polymeric film substrate 1 and provided on both sides thereof magnetic recording layers 2, 2', protective layers 3, 3', and organic lubricating layers 4, 4', or as shown in FIG. 3, may be additionally provided with a back coat layer 5 on the protective layer 3'. In the magnetic recording medium constituted as shown in FIG. 2, the magnetic recording layers on the both sides can be used as magnetic recording layers.

In FIG. 2, the magnetic recording layers 2 and 2' may be equal in thickness when they are simultaneously formed. When, however, any one of the layers is formed first, their formation with equal thickness may sometimes result in no satisfactory correction of the curling of the medium.

This is presumably because the thermal properties of the substrate film are changed when a magnetic recording layer is formed on any one side of the substrate, so that the condition substantially differs in the formation of the first magnetic recording layer when another magnetic recording layer is formed on the other side of the substrate. Accordingly, any one of the magnetic recording layers 2 and 2' may be made appropriately thiner if it is necessary to control the curling. Similarly, the silicon dioxide thin films 3, 3' may also be equal in thickness, or any one of them may be appropriately thiner than the other.

Figure 4:
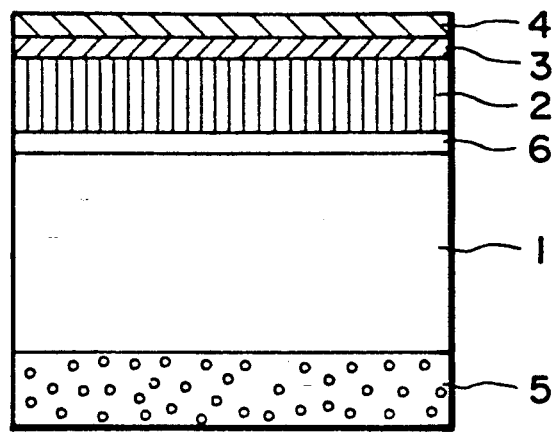
Figure 5:
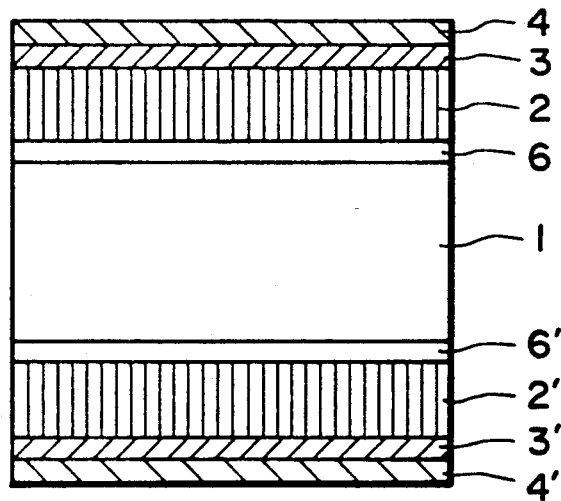
Figure 6:
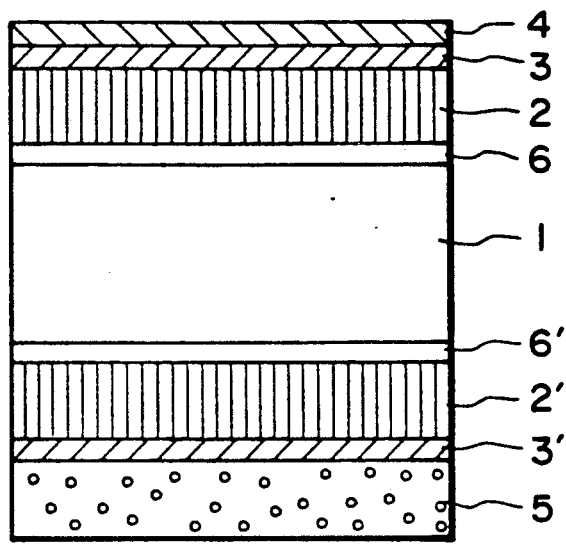

The magnetic recording layer 2 may be comprised of either a single layer or multi-layers. In some instances, as shown in FIGS. 4, 5 and 6, for the purpose of improving the adhesion power with the base film, crystal arrangement and magnetic property, thin films comprising Al, Ge, Cr, Ti or $SiO_2$, or, as backing layers of the perpendicular magnetization film, high-permeability layers such as Fe-Ni films or Co-Zr films may be provided as intermediate layers 6, 6'.

The rigid magnetic recording medium comprises any of the magnetic recording mediums as described with reference to FIGS. 1 to 6, the substrates of which are comprised of rigid materials such as nonmagnetic metals.

Figure 7:
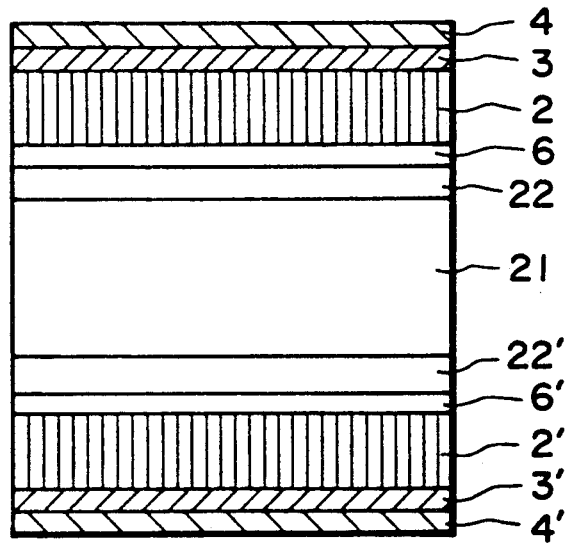

FIG. 7 shows a typical example of the rigid magnetic recording medium. In FIG. 7, the intermediate layer 6, magnetic recording layer 2, protective layer 3 and lubricating layer 4 are the same as those of the flexible magnetic recording mediums described with reference to FIGS. 1 to 6. Hence, descriptions therefor are not repeated. The back coat layer is also the same as the back coat layer 5 in FIG. 1, and hence descriptions therefor are not repeated. In the case of the rigid magnetic recording medium, however, the protective layer 3 may have desirably a thickness of not more than 500 Å, and most preferably not more than 300 Å. The lower limit of the thickness of the protective layer 3 may be set to a measure that may not result in the impairment of the function of the protective layer 3, for example, be not less than 50 Å, and preferably not less than 100 Å.

As materials for a substrate 21, nonmagnetic metals may preferably be used. For example, it is preferred to use an aluminum alloy. Besides, resins such as polysulfone and polyimides, and glass can also be used as materials for the substrate 21. It is preferred for the substrate 21 to be optionally provided with a surface-processed layer 22. The surface-processed layer 22 may preferably be exemplified by a Ni-P alloy layer or an anodized layer (an anodized aluminum layer). The surface of the surface-processed layer 22 is subjected to mirror polishing, and then optionally so formed as to have any desired surface roughness. The substrate 21 may preferably have a thickness ranging from 0.5 to 3 mm.

The rigid magnetic recording medium may preferably have a surface roughness in the same range as the surface roughness of the flexible magnetic recording medium.

EXAMPLES

The present invention will be described below in greater detail by giving Examples.

EXAMPLE 1

FIG. 3 schematically illustrates the constitution of the medium according to the present Example.

On both sides of a polyimide film substrate 1 (a product of Ube Industries, Ltd.; a UPILEX-S type; coefficient of thermal expansion: $1.2 \times 10^{-5}$ cm/cm/°C.; modulus in tension: 1,020 kg/mm²; surface roughness: 300 Å in height of the protuberance corresponding to 0.01 % order from a highest protuberance; protuberance density: $5 \times 10^6$ protuberances/mm²), Co-Cr perpendicular magnetization films 2, 2' were formed using a sputtering apparatus of an opposed target type, and subsequently silicon oxide thin films 3, 3' were formed using an RF magnetron sputtering apparatus.

Figure 8:
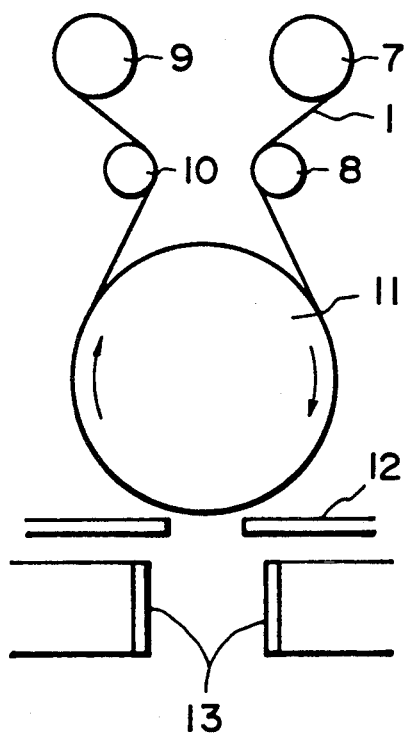
FIG. 8 is a schematic side elevation of an opposed-target sputtering apparatus.

FIG. 8 schematically illustrates the sputtering apparatus of an opposed target type, used in the present invention. The polyimide film substrate 1 of continuous length, having a thickness of 20 μm and a width of 80 mm, was subjected to heat treatment in vacuo prior to the formation of the magnetic layer. Stated specifically, the polyimide film substrate 1 of continuous length was conveyed in vacuo in contact with a rotating drum 11 (30 mm in diameter) whose temperature was raised to 190° C., during which the heat treatment was carried out under an ultimate pressure kept at not more than $2 \times 10^{-3}$ Pa. During the heat treatment, the polyimide film substrate 1 was under a tension of 1.2 kg and conveyed at a speed of 6 cm/min.

After the heat treatment, the inside was evacuated up to an ultimate degree of vacuum, of $5 \times 10^{-4}$ Pa or less, and thereafter a Co-Cr perpendicular magnetization film was formed. Targets 13 each had a dimension of 4 inches × 6 inches × 6 millimeters. The distance from the middle of the space between the targets to the surface of the rotating drum was 120 mm. The targets were composed of 80% by weight of Co and 20% by weight of Cr. The film formation was carried out under conditions of an argon pressure of 0.2 Pa, an input power of 2.5 kW, a film formation rate of 1,000 Å/min., a temperature of the rotating drum 11, of 190° C., and a tension of the polyimide film substrate 1, of 1.2 kg. The Co-Cr magnetic layer thus formed had a thickness of 0.4 μm. After the magnetic layer 2 was formed on the one side, the other Co-Cr magnetic layer 2' was also formed on the back under the same film formation conditions. A roll 7 is a roll to deliver the substrate 1, rolls 8 and 10 are conveying rolls, and a roll 9 is a roll to wind up the substrate 1. The numeral 12 denotes a masking shield.

On the resulting Co-Cr magnetic layers 2, 2', the silicon oxide thin films 3, 3' were formed as protective layers, using an RF magnetron sputtering apparatus.

Figure 9:
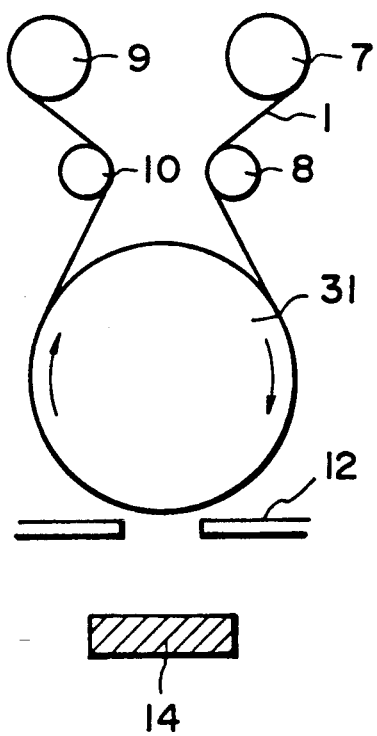
FIG. 9 is a schematic side elevation of an RF magnetron sputtering apparatus.

FIG. 9 schematically illustrates the RF magnetron sputtering apparatus used in the present invention. Using an SiO$_2$ target 14 of 4 inches in diameter, the films were formed under conditions of a temperature of a rotating drum 31, of 200° C., an argon pressure of 0.3 Pa, an input power of 2 kW, and a film formation rate of 0.05 μm/min. The film thus formed had a thickness of 200 Å. The electrical specific resistance of the silicon oxide thin film formed here was measured by the method as described below, to reveal that it was $7.0 \times 10^{13}$ Ω.cm.

Method of measuring electrical specific resistance

Figure 10:
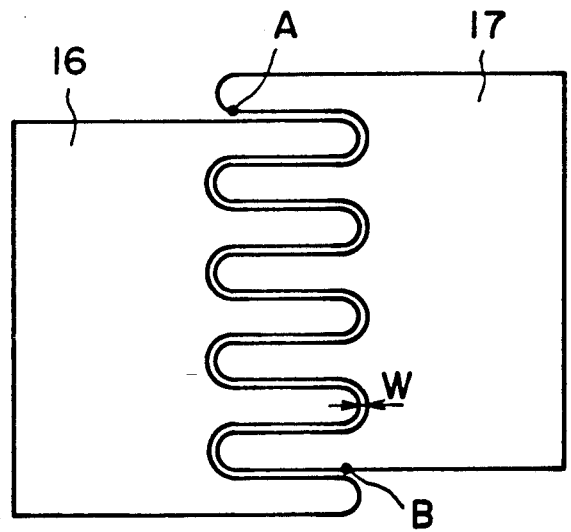
FIG. 10 is a plan view to show the forms of aluminum electrodes used when the electrical specific resistance of a protective layer is measured.

A silicon oxide thin film was formed on a silicon wafer under the same conditions as those for the formation of the protective layers of the above silicon oxide thin films, and Al electrodes 16, 17 were further formed thereon in a thickness of 0.2 μm by vacuum deposition to give the forms as shown in FIG. 10 as a plan view. The space W between the electrodes was 0.25 mm, and the length Ω of the part through which a pair of electrodes are opposed (in FIG. 10, the length from point A to point B of the electrode 17) was 50 mm. A DC voltage was applied between the electrodes, and a resistivity was calculated from its leakage current value.

The refractive indexes of the silicon oxide thin films 3, 3' were also measured using an ellipsometer to reveal that they were 1.462 and 1.463, respectively.

The pinhole density of the silicon oxide thin films 3, 3' was further measured by the copper decoration method [wherein electrochemical reaction in an organic solvent is utilized, as detailed in Shiono and Yashiro, Oyo Butsuri (Applied Physics), Vol. 45, No. 10 (1976), 952, entitled as "Methods of Evaluating Pinholes in SiO$_2$ Films"], to reveal that it was 3.1 holes/cm$^2$ on the average.

Subsequent to the formation of the protective layers 3, 3', an ester oligomer (a product of Asahi Glass Co., Ltd.; trade name: ST-117) was applied on the protective layer 3 by coating to form a lubricating layer 4 with a thickness of 20 Å.

Next, a back coat solution (a product of Toyo Ink Mfg. Co., Ltd.; trade name: TPB-3091 Black) formed by incorporating fine particles of carbon black and CaCO$_3$ into a polyester binder was applied only on the protective layer 3' to form a back coat layer 5 with a thickness of 0.5 μm by coating.

The magnetic recording medium prepared in this way was punched in the form of a disk of 47 mm in diameter to give a video floppy disk.

The video floppy disk thus obtained was set on a commercially avaiable video floppy disk drive deck (manufactured by Fuji Photo Film Co., Ltd.; trade name: FUJIX P-3) to measure RF output and carry out durability tests. Results obtained are shown in Table 1.

The RF output of the magnetic recording medium according to the present Example was +3.8 dB, assuming as 0 dB the RF output level of a commercially available coat-type medium (trade name: Canon Video Floppy Disk VF-50, hereinafter "MP") (hereinafter "MPL").

In the durability test, reproduction only was made after signals of 7 MHz were recorded, and the variation of the reproduction output was observed, where the time taken before the reproduction output had attenuated to the initial value −3 dB was defined as a durability time. The durability was evaluated based on the durability time.

In a still durability test at ordinary temperature (25° C.), the reproduction output fell to −0.6 dB relative to the initial value, after lapse of 48 hours (about 10,000,000 passes). Since the standard requires that the still durability is not less than 48 hours, the durability test was stopped at the time when 50 hours lapsed. It, however, was presumed that a satisfactory durability would have been maintained even after that time.

On the other hand, in a still durability test at a high temperature and high humidity (40° C., 85% RH), the durability time was 16 hours (about 3,500,000 passes).

It has become evident from the foregoing results that the floppy disk obtained in the present Example has well satisfied the durability standard for data recording, in respect of the pass times.

It was also found that, when compared with MP, the floppy disk obtained in the present Example shows greatly high reproduction output, and its durability has reached the practical level in the durability standard for data recording.

The floppy disk obtained in the present Example was also left to stand in an natural environment for a year to make evaluation in the same manner as in the above. As a result, similar results were obtained. This shows that the magnetic recording medium of the present invention has superior storage durability.

EXAMPLE 2

Example 1 was repeated to prepare a magnetic recording medium (video floppy disk), except that the silicon oxide thin films 3, 3' serving as protective layers were formed under conditions in which the argon pressure was changed to 0.4 Pa.

The silicon oxide thin films formed here each had an electrical specific resistance of $3.3 \times 10^{13}$ Ω.cm.

The refractive indexes of the silicon oxide thin films 3, 3' thus formed were also measured using an ellipsometer to reveal that they were both 1.465.

The measurement of RF output and the durability tests on the video floppy disk obtained were carried out in the same manner as in Example 1. Results obtained are shown in Table 1.

Namely, the RF output was MPL +3.5 dB.

In a still durability test at ordinary temperature (25° C.), the reproduction output fell to −1.1 dB relative to the initial value, after lapse of 48 hours (about 10,000,000 passes). Since the standard prescribes that the still durability is not less than 48 hours, the durability test was stopped at the time when 50 hours lapsed. It, however, was presumed that a satisfactory durability would have been maintained even after that time.

On the other hand, in a still durability test at a high temperature and high humidity (40° C., 85% RH), the durability time was 15 hours (about 3,200,000 passes).

It has become evident from the foregoing results that the floppy disk obtained in the present Example has well satisfied the durability standard for data recording, in respect of the pass times.

It was also found that, when compared with MP, the floppy disk obtained in the present Example shows greatly high reproduction output, and its durability has reached the practical level in the durability standard for data recording.

EXAMPLE 3

Example 1 was repeated to prepare a magnetic recording medium (video floppy disk), except that the silicon oxide thin films 3, 3' serving as protective layers were formed under conditions in which the argon pressure was changed to 0.5 Pa.

The silicon oxide thin films formed here each had an electrical specific resistance of $2.1 \times 10^{13}$ $\Omega$.cm.

The refractive indexes of the silicon oxide thin films 3, 3' thus formed were also measured using an ellipsometer to reveal that they were 1.466 and 1.464, respectively.

The measurement of RF output and the durability tests on the video floppy disk obtained were carried out in the same manner as in Example 1. Results obtained are shown in Table 1.

The RF output was MPL +3.3 dB.

In a still durability test at ordinary temperature (25° C.), the reproduction output fell to −1.5 dB relative to the initial value, after lapse of 48 hours (about 10,000,000 passes). Since the standard requires that the still durability is 48 hours or more, the durability test was stopped at the time when 50 hours lapsed. It, however, was presumed that a satisfactory durability would have been maintained even after that time.

On the other hand, in a still durability test at a high temperature and high humidity (40° C., 85% RH), the durability time was 9 hours (about 1,900,000 passes).

It has become evident from the foregoing results that the floppy disk obtained in the present Example has well satisfied the durability standard for data recording, in respect of the pass times.

It was also found that, when compared with MP, the floppy disk obtained in the present Example shows greatly high reproduction output, and its durability has reached the practical level in the durability standard for data recording.

EXAMPLE 4

Example 1 was repeated to prepare a magnetic recording medium (video floppy disk), except that the silicon oxide thin films 3, 3' serving as protective layers were formed under conditions in which the argon pressure was changed to 0.6 Pa.

The silicon oxide thin films formed here each had an electrical specific resistance of $1.0 \times 10^{12}$ $\Omega$.cm.

The refractive indexes of the silicon oxide thin films 3, 3' thus formed were also measured using an ellipsometer to reveal that they were 1.495 and 1.494, respectively.

The measurement of RF output and the durability tests on the video floppy disk obtained were carried out in the same manner as in Example 1. Results obtained are shown in Table 1.

The RF output was MPL +3.0 dB.

In a still durability test at ordinary temperature (25° C.), the reproduction output fell to −1.9 dB relative to the initial value, after lapse of 48 hours (about 10,000,000 passes). Since the standard requires that the still durability is 48 hours or more, the durability test was stopped at the time when 50 hours lapsed. It, however, was presumed that a satisfactory durability would have been maintained even after that time.

On the other hand, in a still durability test at a high temperature and high humidity (40° C., 85% RH), the durability time was 5 hours (about 1,100,000 passes).

It has become evident from the foregoing results that the floppy disk obtained in the present Example has well satisfied the durability standard for data recording, in respect of the pass times.

It was also found that, when compared with MP, the floppy disk obtained in the present Example shows greatly high reproduction output, and its durability has reached the practical level in the durability standard for data recording.

COMPARATIVE EXAMPLE 1

Example 1 was repeated to prepare a magnetic recording medium (video floppy disk), except that the silicon oxide thin films 3, 3' serving as protective layers were formed under conditions in which the argon pressure was changed to 0.7 Pa.

The silicon oxide thin films formed here each had an electrical specific resistance of $5.5 \times 10^{11}$ $\Omega$.cm.

The refractive indexes of the silicon oxide thin films 3, 3' thus formed were also measured using an ellipsometer to reveal that they were both 1.503.

The measurement of RF output and the durability tests on the video floppy disk obtained were carried out in the same manner as in Example 1. Results obtained are shown in Table 1.

The RF output was substantially equal to that of MP. In the still durability tests, results were as follows: at ordinary temperature, 2 hours (about 400,000 passes), and at a high temperature and high humidity (40° C., 85% RH), 0.5 hour (about 100,000 passes), showing a very poor durability. Scratches appeared on the medium after the durability test, and powder was adhered around the scratches. Scratches, and adhesion of lubricant and powder, were also seen on the surface of the head.

EXAMPLE 5

Example 1 was repeated to prepare a magnetic recording medium (video floppy disk), except that the lubricating layer 4 was not formed.

The protective layers formed here each had an electrical specific resistance of $7.0 \times 10^{13}$ $\Omega$.cm.

The refractive indexes of the silicon oxide thin films 3, 3' thus formed were also measured using an ellipsometer to reveal that they were 1.462 and 1.463, respectively.

The measurement of RF output and the durability tests on the video floppy disk obtained were carried out in the same manner as in Example 1. Results obtained are shown in Table 1.

The RF output was MPL +3.9 dB. Still durability was as follows: at ordinary temperature, 48 hours (about 10,000,000 passes) or more, which were on the same level as Example 1. At a high temperature and high humidity (40° C., 85% RH), the still durability time was 10 hours (about 220 passes). Forming the lubricating layer brought about a much improvement in the still durability under conditions of the high temperature and high humidity.

EXAMPLE 6

Example 1 was repeated to prepare a magnetic recording medium (video floppy disk), except that the polyimide film 1 was replaced with a substrate (UPILEX-S type; a product of Ube Industries, Ltd.) with a coefficient of thermal expansion, of $1.2 \times 10^{-5}$ cm/cm/°C., a modulus in tension, of 1,050 kg/mm$^2$, and a surface roughness of Rmax 50 Å or less, having no fine irregularities formed thereon.

The protective layers formed here each had an electrical specific resistance of $7.0 \times 10^{13}$ Ω.cm.

The refractive indexes of the silicon oxide electrical specific resistance of $7.0 \times 10^{-}$Ω.cm.

The refractive indexes of the silicon oxide thin films 3, 3' thus formed were also measured using an ellipsometer to reveal that they were both 1.462.

The measurement of RF output and the durability tests on the video floppy disk obtained were carried out in the same manner as in Example 1.

The RF output was MPL +7.0 dB. Still durability was as follows: at ordinary temperature, 14 hours (about 3,000,000 passes), and at a high temperature and high humidity (40° C., 85% RH), about 5 hours (about 1,100,000 passes). Forming no fine irregularities on the surface of the medium brought about a decrease in the spacing loss and an improvement in the reproduction output, but with durability slightly lowered. The durability, however, was within the range of the practical level.

EXAMPLE 7

Example 1 was repeated to prepare a magnetic recording medium (video floppy disk) under the same conditions, except that, at the time the protective layers were formed, TiO$_2$ pellets were welded on the SiO$_2$ target of 4 inches in diameter so as to give an area ratio of about 15%, which was used as a target for the formation of the protective layers.

Si-Ti-O thin films formed here each had an electrical specific resistance of $2.8 \times 10^{13}$ Ω.cm.

The refractive indexes of the silicon oxide thin films 3, 3' thus formed were also measured using an ellipsometer to reveal that they were both 1.464.

The measurement of RF output and the durability tests on the video floppy disk obtained were carried out in the same manner as in Example 1. Results obtained are shown in Table 1.

The RF output was MPL +3.8 dB. Still durability was as follows: at ordinary temperature, 48 hours (about 10,000,000 passes) or more, and at a high temperature and high humidity (40° C., 85% RH), 35 hours (about 7,600,000 passes). Thus, forming the protective layers mainly composed of the oxide of silicon, with Ti added as an additional element to Si-O, brought about an improvement in the still durability at the high temperature and high humidity.

EXAMPLE 8

FIG. 1 schematically illustrates the constitution of the medium according to the present Example.

On the surface of a polyimide film substrate 1 of 7.5 μm thick (a product of Ube Industries, Ltd.; a UPILEX copolymer type; coefficient of thermal expansion: $1.5 \times 10^{-5}$ cm/cm/°C.; modulus in tension: 580 kg/mm$^2$; surface roughness: 320 Å in height of the protuberance corresponding to 0.01% order from a highest protuberance; protuberance density: $5 \times 10^6$ protuberances/mm2), a Co-Cr perpendicular magnetization film 2 was formed by electron beam (EB) vapor deposition.

Figure 11:
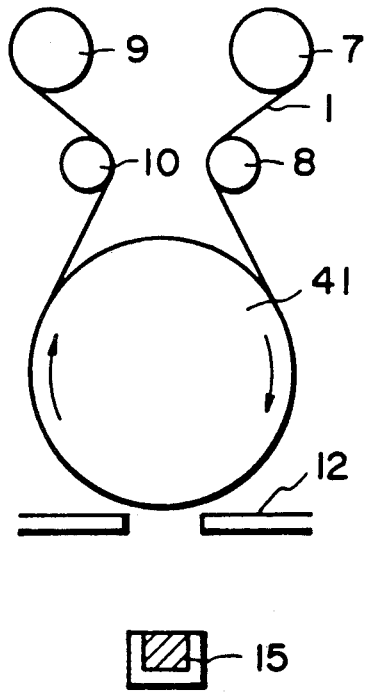
FIG. 11 is a schematic side elevation of an EB vapor deposition apparatus.

FIG. 11 schematically illustrates the EB vapor deposition apparatus used in the present invention.

The polyimide film substrate 1 was not subjected to the preheat treatment. The temperature of a rotating drum 41 was set to 200° C., and electron beams were shot on an alloy deposition source 15 comprising 80% by weight of Co and 20% by weight of Cr to continuously carry out vapor deposition. The film was formed at a rate of 0.5 μm/min and with a film thickness of 0.35 μm.

Next, on the Co-Cr perpendicular magnetization film 2, a silicon oxide thin film 3 was formed as a protective layer by sputtering. Using an SiO$_2$ target of 4 inches in diameter, the film was formed under conditions of a temperature of a rotating drum 41, of 200° C., an argon pressure of 0.3 Pa, an O$_2$ partial pressure of 6%, an input power of 2 kW, and a film formation rate of 0.05 μm/min. The film thus formed had a thickness of 100 Å. The electrical specific resistance of the silicon oxide thin film formed here was $8.0 \times 10^{13}$ Ω.cm.

The refractive index of the silicon oxide thin film 3 thus formed was also measured using an ellipsometer to reveal that it was 1.462.

Next, FEP (a product of Du Pont Co.) was applied on the protective layer 3 to form a lubricating layer 4 with a thickness of about 20 Å.

On the back of the polyimide film substrate 1, a back coat layer 5 was also formed by coating. A solution (a product of Toyo Ink Mfg. Co., Ltd.; trade name: TB-5014 Black) formed by incorporating fine particles of carbon black and TiO$_2$ into a urethane type binder was used as the material for the coating. The resulting layer had a film thickness of 0.5 μm.

The magnetic recording medium prepared in this way was cut into a tape of 8 mm wide to give a magnetic tape.

Using the magnetic tape thus obtained, recording and reproduction were carried out on a commercially available 8 mm video deck (manufactured by Sony Corp.; trade name: EV-A80) to evaluate the RF reproduction output, pass durability and still durability. Results obtained are shown in Table 2.

A test for the above pass durability is carried out by recording RF signals and thereafter making only reproduction under pass travel, thereby examining the variations of reproduction output. The time taken until the reproduction output had attenuated to the initial value −3 dB was defined as a pass durability time, on the basis of which the durability was evaluated.

A test for the still durability is carried out by recording RF signals and thereafter making only reproduction under still travel, thereby examining the variations of reproduction output. The time taken until the reproduction output had attenuated to the initial value −3 dB was defined as a still durability time, on the basis of which the durability was evaluated.

The RF reproduction output was 4.0 dB higher than the RF reproduction output level of a commercially available coat-type tape (trade name: Canon 8 mm Video Tape P6) (hereinafter "MPL'"). The pass durability and still durability were both on the practical level.

EXAMPLE 9

Example 8 was repeated to prepare a magnetic tape, except that the silicon oxide thin film 3 serving as a protective layer was formed under conditions in which the argon pressure was changed to 0.3 Pa and the oxygen partial pressure to 10%.

The silicon oxide thin film formed here had an electrical specific resistance of $3.4 \times 10^{14}$ Ω.cm.

The refractive index of the silicon oxide thin film 3 thus formed was also measured using an ellipsometer to reveal that it was 1.461.

The magnetic tape thus obtained was evaluated in the same manner as in Example 8. Results obtained are shown in Table 2.

The RF output was MPL' +3.7 dB. The pass durability and still durability were both on the practical level.

EXAMPLE 10

Example 8 was repeated to prepare a magnetic tape, except that the silicon oxide thin film 3 serving as a protective layer was formed under conditions in which the argon pressure was changed to 0.3 Pa and the oxygen partial pressure to 14%.

The silicon oxide thin film formed here had an electrical specific resistance of $7.5 \times 10^{14}$ Ω.cm.

The refractive index of the silicon oxide thin film 3 thus formed was also measured using an ellipsometer to reveal that it was 1.460.

The magnetic tape thus obtained was evaluated in the same manner as in Example 8. Results obtained are shown in Table 2.

The RF output was MPL' +3.7 dB. The pass durability and still durability were both on the practical level.

EXAMPLE 11

Example 8 was repeated to prepare a magnetic tape, except that the silicon oxide thin film 3 serving as a protective layer was formed under conditions in which the argon pressure was changed to 0.3 Pa and the oxygen partial pressure to 16%.

The silicon oxide thin film formed here had an electrical specific resistance of $1.0 \times 10^{15}$ Ω.cm.

The refractive index of the silicon oxide thin film 3 thus formed was also measured using an ellipsometer to reveal that it was 1.460.

The magnetic tape thus obtained was evaluated in the same manner as in Example 8. Results obtained are shown in Table 2.

The RF output was MPL' +3.1 dB. The pass durability and still durability were both on the practical level.

EXAMPLE 12

Example 1 was repeated to prepare a video floppy disk, except that the silicon oxide thin films 3, 3' serving as protective layers were formed under conditions in which the argon pressure was changed to 0.3 Pa and the oxygen partial pressure to 18%.

The silicon oxide thin films formed here each had an electrical specific resistance of $5.0 \times 10^{15}$ Ω.cm.

The refractive indexes of the silicon oxide thin films 3, 3' thus formed were also measured using an ellipsometer to reveal that they were 1.460 and 1.461, respectively.

The video floppy disk obtained were evaluated in the same manner as in Example 1. Results obtained are shown in Table 1. The RF output was MPL' +1.2 dB. Still durability was as follows: at ordinary temperature, 30 hours (about 6,500,000 passes), and at a high temperature and high humidity (40° C., 85% RH), 5 hours (about 1,100,000 passes).

It has become evident from the foregoing results that the floppy disk obtained in the present Example has well satisfied the durability standard for data recording, with respect to the number of times of pass.

It was also found that, when compared with MP, the floppy disk obtained in the present Example shows greatly high reproduction output, and its durability has reached the practical level in the durability standard for data recording.

TABLE 1

|  | Electrical specific resistance (Ω · cm) | RF output*1 (dB) | Still durability time (hr)*2 | |
|---|---|---|---|---|
|  |  |  | Ordinary temp. | High temp. high humid. (40° C., 85% RH) |
| Example: |  |  |  |  |
| 1 | $7.0 \times 10^{13}$ | +3.8 | >48 | 16 |
| 2 | $3.3 \times 10^{13}$ | +3.5 | >48 | 15 |
| 3 | $2.1 \times 10^{13}$ | +3.3 | >48 | 9 |
| 4 | $1.0 \times 10^{12}$ | +3.0 | >48 | 5 |
| Comparative Example: 1 | $5.5 \times 10^{11}$ | ±0 | 2 | 0.5 |
| Example: |  |  |  |  |
| 5 | $7.0 \times 10^{13}$ | +3.9 | >48 | 10 |
| 7 | $3.8 \times 10^{13}$ | +3.8 | >48 | 35 |
| 12 | $5.0 \times 10^{15}$ | +1.2 | 30 | 5 |

*1: An output level of a commercially available coat-type magnetic recording medium (MP) is assumed as 0 dB.
*2: Durability time refers to the time taken until the reproduction output has attenuated to the initial value −3 dB. The practical levels for a floppy disk are 3,000,000 passes (about 13 hours for video floppy disks) or more at ordinary temperature, and 1,000,000 passes (about 5 hours) or more at a high temperature and high humidity.

TABLE 2

| Example: | Electrical specific resistance (Ω · cm) | RF output*1 (dB) | Pass durability*3 (times) | Still durability*3 (min) |
|---|---|---|---|---|
| 8 | $8.0 \times 10^{13}$ | +4.0 | >200 | >120 |
| 9 | $3.4 \times 10^{14}$ | +3.7 | >200 | >120 |
| 10 | $7.5 \times 10^{14}$ | +3.3 | >200 | >120 |
| 11 | $1.0 \times 10^{15}$ | +3.1 | >200 | >120 |

*3: Time taken until the reproduction output has attenuated to the initial value −3 dB is regarded as the durability time. Practical levels are 200 passes or more as to the pass durability, and 120 minutes or more as to the still durability.

EXAMPLE 13

A medium with the constitution as shown in FIG. 7 was prepared.

On an aluminum alloy substrate 21 of 1.27 mm thick, an anodizing treatment was applied by a known method. Aluminum oxide surface-treated layers 22, 22' were formed with a thickness of about 15 μm each. Subsequently their surfaces were mirror polished and then well washed. Thereafter the resulting substrate provided with these layers were set in a sputtering apparatus, to successively form thereon by magnetron sputtering in the in-line system, MoCu-Permalloy (JIS C2531; compositional ratio: 78% Ni, 4% Mo, also containing Cu, Cr, and the balance Fe) films 6, 6' as the soft magnetic layers and Co-Cr perpendicular magnetization films 2, 2' as the recording layers with a thickness of 0.5 μm for each. They were formed under conditions of a substrate temperature of 120° C., a target size of 8 inches (203.2 mm) in diameter, Co-Cr target composition of 80 wt. % Co- 20 wt. % Cr, an argon pressure of 0.2 Pa, an input power of 1 kW, and a film formation rate of 400 Å/min.

Next, on the Co-Cr magnetic films 2, 2', silicon oxide thin films 3, 3' serving as protective layers were formed by RF magnetron sputtering. Here, using an SiO$_2$ target of 8 inches in diameter, the films were formed under conditions of a substrate temperature of 200° C., an argon pressure of 0.3 Pa, an input power of 2 kW, and a film formation rate of 0.05 μm/min. The film thus formed had a thickness of 270 Å.

The electrical specific resistance of the silicon oxide thin films 3, 3' formed here was measured by the method as previously described, to reveal that it was $7.0 \times 10^{13}$ Ω.cm.

The refractive indexes of the silicon oxide thin films 3, 3' thus formed were also measured using an ellipsometer to reveal that they were both 1.462.

Next, a 0.1% Freon dilute solution of Krytox 143AD (a product of Du Pont Co.) was applied on the protective layers 3, 3' to form lubricating layers 4, 4' so as to give a dry thickness of about 30 Å.

Electromagnetic conversion characteristics of the magnetic recording medium of 3.5 inches in diameter, thus obtained, was measured to confirm that high-density recording of 70 kbpi was possible.

Figure 12:
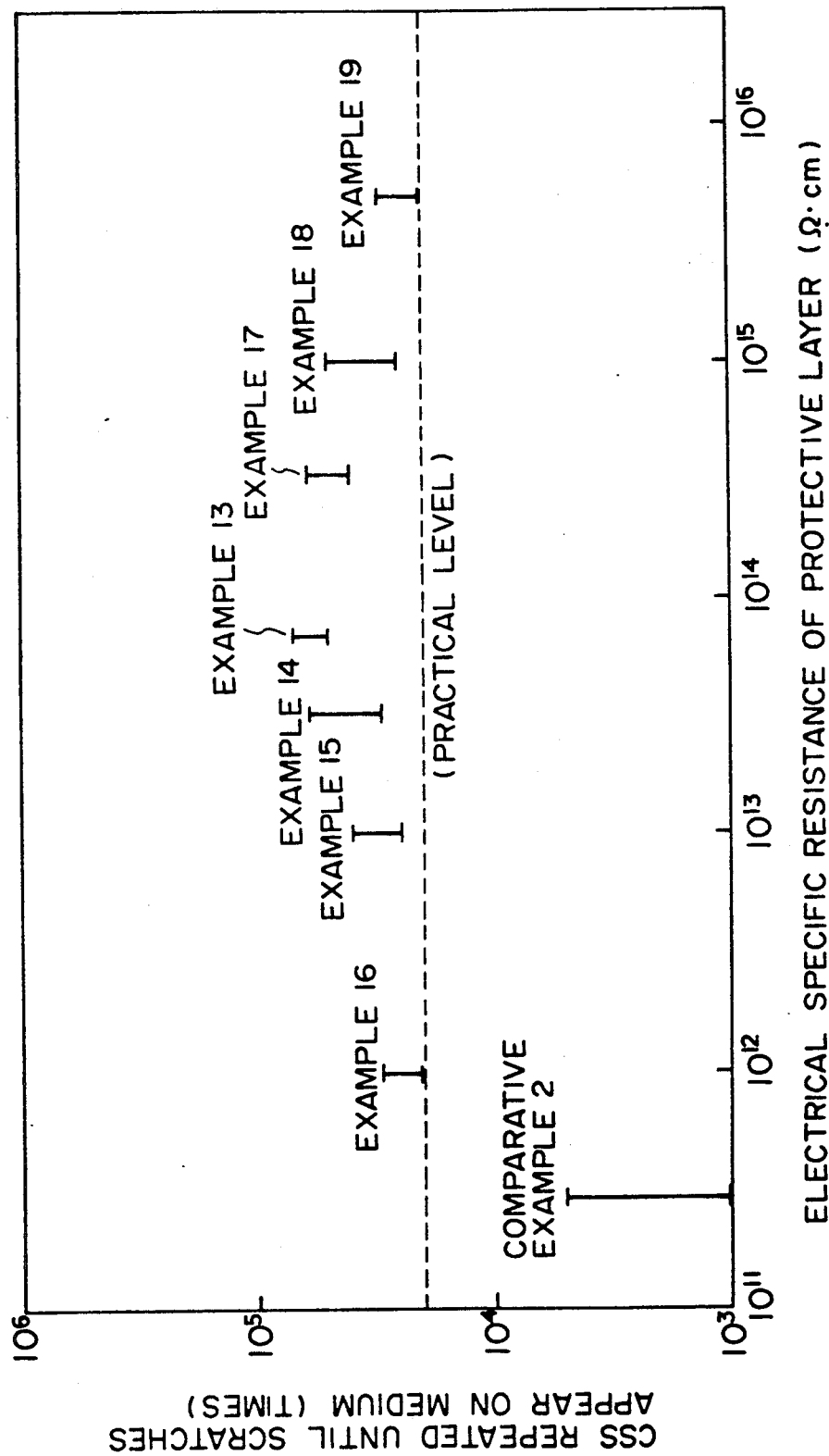
FIG. 12 is a graph to show the relationship between the electrical specific resistance of protective layers comprising an oxide of silicon and the number of times of the CSS repeated until scratches appear on magnetic recording mediums.

FIG. 12 shows results obtained when the medium was set on a 3.5 inch hard disk drive SRD2040Z, manufactured by Sony Corp., and CSS tests were repeated 10 times with changes of trucks. The number of times of CSS until scratches appeared on the medium was 50,000 to 70,000. At the 20,000th time, which is a standard for the practical level, no changes and damage were seen at all on the medium.

No changes were also seen when the medium was left to stand for 500 hours in an environment of a high temperature and high humidity (85° C., 85% RH).

Thus, it can be said from the foregoing that the medium according to the present Example has a greatly higher reproduction output than that of the conventional coat-type magnetic recording mediums, and besides have reached the practical revel in all the durability, wear resistance and environmental resistance.

EXAMPLE 14

Example 13 was repeated to prepare a magnetic recording medium, except that the silicon oxide thin films 3, 3' serving as protective layers were formed under conditions in which the argon pressure was changed to 0.4 Pa.

The silicon oxide thin films 3, 3' formed here each had an electrical specific resistance of $3.3 \times 10^{13}$ Ω.cm.

The refractive indexes of the silicon oxide thin films 3, 3' thus formed were also measured using an ellipsometer to reveal that they were 1.465 and 1.463, respectively.

The medium thus obtained was evaluated in the same manner as in Example 13. As a result, as FIG. 12 shows, the number of times of CSS until scratches appeared on the medium was 30,000 to 60,000. At the 20,000th time, which is a standard for the practical level, no changes and damage were seen at all on the medium. No changes were also seen on this medium for 500 hours or more in the high temperature and high humidity test described in Example 13. The present medium also showed substantially the same electromagnetic conversion characteristics as those of the medium of Example 13.

EXAMPLE 15

Example 13 was repeated to prepare a magnetic recording medium, except that the silicon oxide thin films 3, 3' serving as protective layers were formed under conditions in which the argon pressure was changed to 0.55 Pa.

The silicon oxide thin films 3, 3' formed here each had an electrical specific resistance of $1.0 \times 10^{13}$ Ω.cm.

The refractive indexes of the silicon oxide thin films 3, 3' thus formed were also measured using an ellipsometer to reveal that they were both 1.471.

The medium thus obtained was evaluated in the same manner as in Example 13. As a result, as FIG. 12 shows, the number of times of CSS until scratches appeared on the medium was 25,000 to 40,000. No changes were also seen on this medium for 500 hours or more in the high temperature and high humidity test described in Example 13. The present medium also showed substantially the same electromagnetic conversion characteristics as those of the medium of Example 13.

EXAMPLE 16

Example 13 was repeated to prepare a magnetic recording medium, except that the silicon oxide thin films 3, 3' serving as protective layers were formed under conditions in which the argon pressure was changed to 0.6 Pa.

The silicon oxide thin films 3, 3' formed here each had an electrical specific resistance of $1.0 \times 10^{12}$ Ω.cm.

The refractive indexes of the silicon oxide thin films 3, 3' thus formed were also measured using an ellipsometer to reveal that they were 1.495 and 1.496, respectively.

The medium thus obtained was evaluated in the same manner as in Example 13. As a result, as FIG. 12 shows, the number of times of CSS until scratches appeared on the medium was 21,000 to 30,000.

No changes were seen on the medium of the present Example for 500 hours or more in the high temperature and high humidity test described in Example 13. The present medium also showed substantially the same electromagnetic conversion characteristics as those of the medium of Example 13.

Comparative EXAMPLE 2

Example 13 was repeated to prepare a magnetic recording medium, except that the silicon oxide thin films 3, 3' serving as protective layers were formed under conditions in which the argon pressure was changed to 0.7 Pa.

The silicon oxide thin films 3, 3' formed here each had an electrical specific resistance of $3.0 \times 10^{11}$ Ω.cm.

The refractive indexes of the silicon oxide thin films 3, 3' thus formed were also measured using an ellipsometer to reveal that they were both 1.511.

The medium thus obtained was evaluated in the same manner as in Example 13. As a result, as FIG. 12 shows, the number of times of CSS until scratches appeared on the medium was 1,000 to 5,000. In practical use, the medium has to endure the CSS test of 20,000 times. The durability of the medium of the present Comparative Example did not reach the practical level in all tracks.

As a result of the high temperature and high humidity test described in Example 13, 2 to 3 fine spots of corrosion appeared. The present medium showed substantially the same electromagnetic conversion characteristics as those of the medium of Example 13.

Thus, it can be said from the foregoing that the medium according to the present Comparative Example has a greatly higher reproduction output, but have not reached the practical revel in the durability and wear resistance. The environmental resistance was also questionable.

EXAMPLE 17

Example 13 was repeated to prepare a magnetic recording medium, except that the silicon oxide thin films 3, 3' serving as protective layers were formed under conditions in which the argon pressure was changed to 0.3 Pa ($O_2$ partial pressure: 10%).

The silicon oxide thin films 3, 3' formed here each had an electrical specific resistance of $3.4 \times 10^{14}$ $\Omega$.cm.

The refractive indexes of the silicon oxide thin films 3, 3' thus formed were also measured using an ellipsometer to reveal that they were 1.461 and 1.462, respectively.

The medium thus obtained was evaluated in the same manner as in Example 13. As a result, as FIG. 12 shows, the number of times of CSS until scratches appeared on the medium was 40,000 to 60,000. This is well over the 20,000 times, the standard for the practical level.

No changes were also seen on the medium of the present Example for 500 hours or more in the high temperature and high humidity test described in Example 13. The present medium also showed substantially the same electromagnetic conversion characteristics as those of the medium of Example 13.

EXAMPLE 18

Example 13 was repeated to prepare a magnetic recording medium, except that the silicon oxide thin films 3, 3' serving as protective layers were formed under conditions in which the argon pressure was changed to 0.3 Pa ($O_2$ partial pressure: 15%).

The silicon oxide thin films 3, 3' formed here each had an electrical specific resistance of $1.0 \times 10^{15}$ $\Omega$.cm.

The refractive indexes of the silicon oxide thin films 3, 3' thus formed were also measured using an ellipsometer to reveal that they were both 1.460.

The medium thus obtained was evaluated in the same manner as in Example 13. As a result, as FIG. 12 shows, the number of times of CSS until scratches appeared on the medium was 25,000 to 50,000.

No changes were also seen on the medium of the present Example for 500 hours or more in the high temperature and high humidity test described in Example 13. The present medium also showed substantially the same electromagnetic conversion characteristics as those of the medium of Example 13.

EXAMPLE 19

Example 13 was repeated to prepare a magnetic recording medium, except that the silicon oxide thin films 3, 3' serving as protective layers were formed under conditions in which the argon pressure was changed to 0.3 Pa ($O_2$ partial pressure: 18%).

The silicon oxide thin films 3, 3' formed here each had an electrical specific resistance of $5.0 \times 10^{15}$ $\Omega$.cm.

The refractive indexes of the silicon oxide thin films 3, 3' thus formed were also measured using an ellipsometer to reveal that they were 1.460 and 1.461, respectively.

The medium thus obtained was evaluated in the same manner as in Example 13. As a result, as FIG. 12 shows, the number of times of CSS until scratches appeared on the medium was 20,000 to 30,000.

No changes were also seen on the medium of the present Example for 500 hours or more in the high temperature and high humidity test described in Example 13. The present medium also showed substantially the same electromagnetic conversion characteristics as those of the medium of Example 13.

As having been described in the above, the magnetic recording medium of the present invention, which has a thin film mainly composed of an oxide of silicon, having an electrical specific resistance of not less than $10^{12}$ $\Omega$.cm, and preferably ranging from $10^{13}$ to $10^{15}$ $\Omega$.cm, is superior in the wear resistance, durability, and long-term storage durability.

We claim:

1. A magnetic recording medium, comprising:
   a substrate;
   a magnetic recording layer provided on at least one side of said substrate; and
   a protective layer of thin film mainly composed of an oxide of silicon,
   wherein said substrate, magnetic recording layer and protective layer are disposed in the order named, and wherein said protective layer has an electrical specific resistance of from $3.3 \times 10^{13}$ to $5.0 \times 10^{15}$ $\Omega$.cm.

2. A magnetic recording medium according to claim 1, wherein said oxide of silicon contained in said protective layer is in an amount of not less than 80% by weight based on said protective layer.

3. A magnetic recording medium according to claim 2, wherein said protective layer contains at least one of the element selected from the group consisting of B, C, N, P, S, Al, Ti, V, Cr, Zn, Ge, Zr, Nb, Mo, Ta, Mg, Hf, Au and Pt, or a compound thereof.

4. A magnetic recording medium according to claim 1, wherein said magnetic recording medium has fine protuberances on its surface; said protuberances having a height of the protuberance corresponding to 0.01% order from a highest protuberance, observed by taking the statistical distribution of the heights of protuberances, of not more than 600 Å, and a protuberance density of from $10^4$ to $10^9$ protuberances/mm$^2$.

5. A magnetic recording medium according to claim 4, wherein said protuberance density ranges from $10^5$ to $10^8$ protuberances/mm$^2$.

6. A magnetic recording medium according to claim 1, wherein said substrate is flexible, and said protective layer has a film thickness of not more than 300 Å.

7. A magnetic recording medium according to claim 6, wherein said substrate has a thickness of not less than 6 $\mu$m and not more than 75 $\mu$m.

8. A magnetic recording medium according to claim 1, wherein said substrate is rigid, and said protective layer has a film thickness of not more than 500 Å.

9. A magnetic recording medium according to claim 8, wherein said substrate has a thickness of not less than 0.5 $\mu$m and not more than 3 $\mu$m.

10. A magnetic recording medium according to claim 1, wherein said protective layer is further provided thereon with a lubricating layer having a thickness of not more than 100 Å.

11. A magnetic recording medium according to claim 1, wherein said magnetic recording layer is a perpendicular magnetization film mainly composed of Co and Cr, and said protective layer is further provided with a lubricating layer.

12. A magnetic recording medium according to claim 11, wherein said magnetic recording layer is a Co-Cr perpendicular magnetization film comprising from 15 to 23% by weight of Cr and 85 to 77% by weight of Co.

13. A method of preparing a magnetic recording medium which comprises a substrate, a magnetic recording layer, and a protective layer of a thin film composed mainly of an oxide of silicon, said substrate, recording layer and protective layer being disposed in the order named, said method comprising the steps of:
   forming said magnetic recording layer on at least one of at least two of said substrates, wherein a magnetic recording layer is not formed on at least one of said substrates;
   forming said thin film protective layer comprising an oxide of silicon upon both (i) said magnetic recording layer formed on one of said substrates and (ii) said substrate on which a magnetic recording layer has not been formed, both of said protective layers being formed under identical conditions; and
   measuring an electrical specific resistance of said thin film protective layer on said substrate on which a magnetic recording layer has not been formed; and
   selecting as said magnetic recording medium a recording medium having a substrate, a magnetic recording layer and a thin film protective layer, wherein said thin film protective layer, wherein said thin film protective layer was prepared under the same conditions as the thin film protective layer which was measured, and wherein said measured thin film protective layer exhibits an electrical specific resistance within $3.3 \times 10^{13}$ to $5.0 \times 10^{15}$ ohm.cm.

* * * * *

UNITED STATES PATENT AND TRADEMARK OFFICE
CERTIFICATE OF CORRECTION

PATENT NO. : 5,132,173
DATED : July 21, 1992
INVENTOR(S) : Takashi Maeno et al.

It is certified that error appears in the above-identified patent and that said Letters Patent is hereby corrected as shown below:

On the title page, item:

[56] References Cited
Attorney, Agent or Firm

Insert: --Attorney, Agent or Firm - Fitzpatrick, Cella, Harper & Scinto--.

COLUMN 2

Line 5, change "type" to --types--.
    Line 16, "a" (second occurrence) should be deleted.

COLUMN 3

Line 36, change "canting" to --cating--.

COLUMN 6

Line 34, change "element" to --elements--.
    Line 61, change "scribe" to --scribed--.

COLUMN 12

Line 68, "a" should be deleted.

COLUMN 15

Line 65, change "were" to --was--.

UNITED STATES PATENT AND TRADEMARK OFFICE
CERTIFICATE OF CORRECTION

PATENT NO. : 5,132,173
DATED : July 21, 1992
INVENTOR(S) : Morimi Hashimoto et al.

It is certified that error appears in the above-identified patent and that said Letters Patent is hereby corrected as shown below:

COLUMN 17

Line 25, change "was" to --were--.
Line 42, change "have" to --has--; and change "revel" to --level--.

COLUMN 18

Line 66, change "substran-" to --substan- --.

COLUMN 19

Line 3, change "have" to --has--.
Line 4, change "revel" to --level--.

UNITED STATES PATENT AND TRADEMARK OFFICE
CERTIFICATE OF CORRECTION

PATENT NO. : 5,132,173

DATED : July 21, 1992

INVENTOR(S) : Morimi Hashimoto et al.

It is certified that error appears in the above-identified patent and that said Letters Patent is hereby corrected as shown below:

<u>COLUMN 20</u>,

Line 34, change "element" to --elements--.

<u>COLUMN 22</u>,

Line 10, delete "wherein said thin film protective layer,".

Signed and Sealed this

Nineteenth Day of October, 1993

Attest:

BRUCE LEHMAN

*Attesting Officer*      *Commissioner of Patents and Trademarks*